UNITED STATES PATENT OFFICE.

PETER DIEDRICH HINRICH OHLHAVER, OF SANDE, GERMANY.

PROCESS OF MAINTAINING THE VITALITY OF DRIED YEAST.

1,039,999.   Specification of Letters Patent.   Patented Oct. 1, 1912.

No Drawing.   Application filed August 24, 1911.   Serial No. 645,830.

*To all whom it may concern.*

Be it known that I, PETER DIEDRICH HINRICH OHLHAVER, a subject of the Emperor of Germany, residing at Sande, Germany, have invented certain new and useful Improvements in Processes of Maintaining the Vitality of Dried Yeast, of which the following is a specification.

This invention relates to a process of treating dried yeast, and has for its object to maintain the vitality of its active organisms and render them effective after any lapse of time, and under severe climatic variations.

When it is desired to prepare fresh yeast for use after long periods of time, and particularly for shipment to tropical climates, it has been usual to subject it to a drying process which can safely be done without killing the yeast if certain precautions are taken. To facilitate the drying of the yeast, the fresh yeast is frequently mixed with various water absorbing substances during the drying process, and for the better preservation of the dried product it is kept in air tight receptacles. In spite of these precautions however the life of the dried yeast as hitherto made gradually ebbs away, the destruction being much accelerated when the yeast is exposed to high temperatures. This circumstance has led to it being known that the supposed preservation of yeast has been quite an illusion hitherto, and no remedy has been found because the cause of the decay could not be ascertained. By careful experiment extending over a number of years I have found out the causes of the decay of the dried yeast and have also at the same time invented a process which will keep the dried yeast permanently alive even in high temperatures.

Dried yeast is hygroscopic and obstinately retains even when exhaustively dried a certain amount of humidity. This small amount of humidity in itself does not harm the dried yeast. However the dry yeast, in spite of its hygroscopic nature, gradually gives up, especially in higher temperatures, a part of its humidity to the air still existing in the air tight receptacle in which it is packed, and it is just this vaporous humidity which proves itself so ruinous to the life of the dry yeast. When the vaporous humidity is present, the enzymes *i. e.* the active constituents of the yeast are awakened from their dormant state, and become excited and active. For want of suitable work these constituents finally destroy themselves and the dry yeast dies away.

In order to maintain the enzymes of dry yeast in a state of repose, the existence of vaporous humidity in the yeast receptacle must be prevented, or better still the air in the receptacle must be kept permanently dry. This essential I obtain by inclosing in the air tight receptacle along with the dry yeast a hygroscopic substance in such a manner that the dry yeast and this hygroscopic substance are separated from each other. For instance within the airtight receptacle the dry yeast can be placed on one side and the hygroscopic substance on the other side; or the dry yeast and the hygroscopic substance are separated in the air tight receptacle by means of a suitable partition which however must allow of the air passing through it; such a partition may be made of perforated tin, linen, gauze, and the like. It is essential that the dry yeast and the hygroscopic substance do not mix but remain separated and that in the case of a partition, the latter be so constructed as to let the air pass through in order that the hygroscopic substance may permanently keep the air dry in the yeast portion of the receptacle. When the dry yeast gives up its final humidity to the surrounding air, the vaporous humidity which would otherwise arise is at once absorbed by the hygroscopic substance, and the air is thus kept dry. For such a hygroscopic substance I use preferably starch, or substances containing starch, chlorid of calcium, and chlorid of magnesium. These substances have not only the property of quickly absorbing vaporized water, thus drying the air, but they also firmly retain the absorbed moisture.

I am aware that the addition of starch, or starchy substances as such, is known; it is however in connection with a different process and for a different purpose. In the process referred to, the fresh yeast is mixed with starch and both are dried together to facilitate the drying process. The yeast and starch being thoroughly mixed, the purpose which I have in view, namely, to permanently keep the air dry in the yeast receptacle, could never be attained in that way. In my process the yeast is first dried with no admixture of starch, but when the starch is subsequently added in the yeast receptacle it is kept separated from the yeast.

It is also known that fresh yeast has been wrapped in blotting paper with which it is dried the parcel thus formed—dry to a certain degree—being afterward enveloped in a layer of burnt gypsum and closed up air-tight. By enveloping the fresh yeast with blotting paper it is sought to avoid infection of the yeast during the drying process, and the further envelopment with burnt gypsum is for the purpose of obtaining an increased drying effect. The blotting paper absorbs the water in the yeast and the gypsum absorbs the water from the blotting paper. These and similar materials absorb the water mechanically when in direct contact with each other, but they are quite useless for my process because they are not hygroscopic, that is to say they do not absorb vaporized humidity contained in the air and are therefore not capable of drying the air in the yeast receptacle and keeping it in a dry condition.

With my process I have kept dry yeast in a hot chamber at a temperature of 40 to 45 degrees C. for $7\frac{1}{2}$ months which as regards its active characteristics has remained perfectly effective up to date. The same dry yeast also in airtight receptacles but without the addition of the separately inclosed hygroscopic substance, had under equal condition after two weeks lost about 70% of its activity. So long as the air is perfectly dry the enzymes of the yeast remain in their state of repose and can consequently stand high temperature without injury, and the durability of the yeast therefore is practically without limit.

What I claim as my invention and desire to secure by Letters Patent is:

1. The herein described process of maintaining the vitality of dried yeast, which consists in maintaining the thoroughly dried yeast and a hygroscopic substance out of contact within an air-tight receptacle for removing the hygroscopically-retained moisture gradually given up by the thoroughly dried yeast to the air within such receptacle.

2. The herein described process of maintaining the vitality of dried yeast, which consists in maintaining the thoroughly dried yeast and a hygroscopic substance containing starch out of contact within an air-tight receptacle for removing the hygroscopically-retained moisture gradually given up by the thoroughly dried yeast to the air within such receptacle.

In testimony whereof I affix my signature in presence of two witnesses.

PETER DIEDRICH HINRICH OHLHAVER.

Witnesses:
ERNEST H. L. MUMMENHOFF,
IDA CHRIST. HAFERMANN.